United States Patent
Leon et al.

(10) Patent No.: US 7,001,788 B2
(45) Date of Patent: Feb. 21, 2006

(54) MASKLESS FABRICATION OF WAVEGUIDE MIRRORS

(75) Inventors: Francisco A. Leon, Palo Alto, CA (US); Lawrence C. West, San Jose, CA (US); Gregory L. Wojcik, Ben Lomond, CA (US); Yuichi Wada, Tomisato (JP)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/858,524

(22) Filed: May 28, 2004

(65) Prior Publication Data

US 2005/0054130 A1     Mar. 10, 2005

Related U.S. Application Data

(60) Provisional application No. 60/474,027, filed on May 29, 2003.

(51) Int. Cl.
*H01L 21/00* (2006.01)

(52) U.S. Cl. ............................................ 438/31

(58) Field of Classification Search ............ 438/22–47, 438/700–713
See application file for complete search history.

(56) References Cited

U.S. PATENT DOCUMENTS

| | | | |
|---|---|---|---|
| 5,357,122 A | 10/1994 | Okubora et al. | |
| 5,987,196 A | 11/1999 | Noble | |
| 5,991,487 A * | 11/1999 | Sugiyama | ............ 385/129 |
| 6,307,242 B1 * | 10/2001 | Sugiyama | ............ 257/432 |
| 6,645,829 B1 | 11/2003 | Fitzgerald | |
| 6,677,655 B1 | 1/2004 | Fitzgerald | |
| 6,680,495 B1 | 1/2004 | Fitzgerald | |
| 2002/0174826 A1 | 11/2002 | Maydan et al. | |
| 2002/0174827 A1 | 11/2002 | Samoilov et al. | |
| 2003/0015770 A1 * | 1/2003 | Talin et al. | ............ 257/622 |
| 2003/0052082 A1 * | 3/2003 | Khan et al. | ............ 216/24 |
| 2003/0072548 A1 | 4/2003 | Bhardwaj et al. | |
| 2003/0110808 A1 | 6/2003 | M'Saad et al. | |
| 2003/0113085 A1 | 6/2003 | M'Saad | |
| 2003/0114006 A1 | 6/2003 | White | |
| 2003/0118310 A1 * | 6/2003 | Steinberg et al. | ............ 385/132 |
| 2003/0213961 A1 * | 11/2003 | Morse | ............ 257/72 |
| 2003/0227072 A1 * | 12/2003 | Forbes et al. | ............ 257/616 |
| 2004/0038434 A1 * | 2/2004 | Kobayashi et al. | ............ 438/11 |
| 2004/0114853 A1 * | 6/2004 | Bjorkman et al. | ............ 385/14 |

FOREIGN PATENT DOCUMENTS

EP     0 661 561 A2     7/1995

(Continued)

OTHER PUBLICATIONS

Chen et al., "Fully Embedded Board-Level Guided-Wave Optoelectronic Interconnects," Proceedings of the IEEE, vol. 88, No. 6, Jun. 2000, pp. 780-793.

(Continued)

*Primary Examiner*—Savitri Mulpuri
(74) *Attorney, Agent, or Firm*—Wilmer Cutler Pickering Hale and Dorr LLP

(57)     ABSTRACT

A method of fabricating a waveguide mirror that involves etching a trench in a silicon substrate; depositing a film (e.g. silicon dioxide) over the surface of the silicon substrate and into the trench; ion etching the film to remove at least some of the deposited silicon dioxide and to leave a facet of film in inside corners of the trench; depositing a layer of SiGe over the substrate to fill up the trench; and planarizing the deposited SiGe to remove the SiGe from above the level of the trench.

11 Claims, 3 Drawing Sheets

FOREIGN PATENT DOCUMENTS

WO     WO 03/036369 A1     5/2003

OTHER PUBLICATIONS

Choi et al., "Self-Aligning Silicon Groove Technology Platform for the Low Cost Optical Module," 1999 Electronic Components and Technology Conference, IEEE, pp. 1140-1144.

Jalali et al., "Advances in Silicon-on-Insulator Optoelectronics," IEEE Journal of Selected Topics in Quantum Electronics, vol. 4, No. 6, Nov./Dec. 1998, pp. 938-947.

Kimerling, "Photons to the Rescue: Microelectronics Becomes Microphotonics," The Electrochemical Society Interface, Summer 2000, pp. 28-31.

Kostal, "Nano-optics Changes the Rules for Optical Components," NanoOpto White Paper 2002.001, Jun. 2002, pp. 1-6.

Kostal and Park, "Nano-optics: New Rules for Optical System Design," NanoOpto White Paper 2002.002, Jun. 2002, pp. 1-10.

Labun, "Profile Simulation of Electron Cyclotron Resonance Planarization of an Interlevel Dielectric," J. Vac. Sci. Tecnol. B. 12(6), 1994, pp 3138-3144.

Machida et al., "SiO2 Planarization Technology With Biasing and Electron Cyclotron Resonance Plasma Deposition for Submicron Interconnections," J. Vac. Sci Technol. B, vol. 4, No. 4, 1986, pp 818-821.

Machida et al., "Effect of Oxygen Ions on Filling SiO2 Into Holes Using Biased Electron Cyclotron Resonance Plasma Deposition," J. Vac. Sci. Technol. B, 11(2), 1993, pp 224-227.

Motorola Labs, "The Discovery: Motorola Labs solves a 30-year semiconductor industry puzzle," Jun. 2002.

Walker et al., "Design and fabrication of high-efficiency beam splitters and beam deflectors for integrated planar micro-optic systems," Applied Optics, vol. 32, No. 14, May 10, 1993, pp. 2494-2501.

Walker et al., "Optical clock distribution using integrated free-space optics," Optics Communications 90 (1992) pp. 359-371.

* cited by examiner

MASKLESS FABRICATION OF WAVEGUIDE MIRRORS

This application claims the benefit of U.S. Provisional Application No. 60/474,027, filed May 29, 2003, which is incorporated herein by reference.

TECHNICAL FIELD

The present invention generally relates to mirrors in optical waveguides and methods of fabricating such mirrors.

BACKGROUND

Distributing information optically has some significant advantages over sending that same information electrically. Generally, optical signals move much faster than electrical signals and thus are characterized by shorter delays in communicating information from one location in a circuit to another. More importantly, they are capable of carrying more information than are electrical signals. And they are not susceptible to deterioration because of the parasitic capacitances and inductances that are currently limiting the attempts to increase speeds and performance in today's complex semiconductor integrated circuits. As a consequence, in recent years there have been many advances in the fields of optical communications and optical signal processing and in the optical media and the optical devices that are used in those fields.

This interest in optical signaling has also had its impact on the integrated circuit fabrication industry as more companies search for ways to combine or integrate photonic elements with the microelectronic devices that have been fabricated on IC chips. There have been many recent advances involving the fabrication of optical waveguide structures on silicon substrates, the fabrication of photodetectors to convert the light to electrical signals that can be used by conventional microelectronic circuitry and the fabrication of light emitters or laser elements for converting the electrical signals to optical signals.

In general, to build an optical signal distribution network for purposes of on-chip optical signaling, one needs to be able to make good optical waveguides to distribute the optical signals and one needs to be able to fabricate elements that get the optical signals into and out of the waveguides to interface with other circuitry. Semiconductor waveguides are being developed to guide the optical signals in directions parallel to the wafer surface. Other elements are also being developed to extract the signals from the waveguide so that they may be delivered to other circuit elements located in another layer that is either above or below the optical signal distribution network. In general, extracting the signals can be accomplished in one of two ways. Either the optical signal itself is extracted out of the waveguide and delivered to other circuitry that can convert it to the required electrical form. Or the optical signal is first converted into an electrical signal and the electrical signal is delivered to other circuitry. Extracting the optical signal as an optical signal involves the use of mirrors within the waveguides or elements that function like mirrors. The scientific literature has an increasing number of examples of technologies that can be used to construct such mirrors.

SUMMARY

The embodiments described herein relate to mirrors that re-direct optical signals out of the waveguide plane. The mirrors are fabricated by etching (e.g. ion etching) a blanket layer of film (e.g. a film made of an amorphous material) that was deposited into a trench. Moreover, they can be fabricated without additional lithographical patterning steps beyond those necessary to pattern the waveguide. Thus, they are easy to fabricate and inexpensive.

In general, in one aspect, the invention features a method of fabricating a waveguide mirror. The method involves etching a trench in a substrate; depositing a film (e.g. a blanket of oxide) over the surface of the substrate and into the trench; etching the film to remove at least some of the deposited oxide and to leave a facet of film in inside corners of the trench; depositing a layer of semiconductor over the substrate to fill up the trench; and planarizing the deposited semiconductor to remove the semiconductor from above the level of the trench.

Embodiments include one or more of the following features. Etching the trench in the substrate involves etching the trench in a silicon substrate. Depositing a film involves depositing a blanket layer of on of an amorphous material, an oxide (e.g. $SiO_2$), SiN, and silicon oxynitride (SiON). Etching the blanket layer of oxide involves using an angle-dependent etch process. Etching the blanket layer of oxide involves dry etching. Etching the blanket of oxide involves ion etching. Depositing the film involves depositing an amorphous material. Depositing the layer of semiconductor involves depositing SiGe.

Other features and advantages of the invention will be apparent from the following detailed and from the claims.

DETAILED DESCRIPTION

Figure 1:
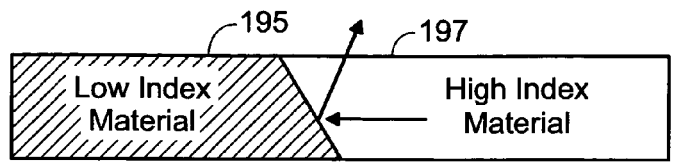
FIG. 1 shows an angled interface between a material with a low index of refraction and a material with a high index of refraction.

An embodiment described in greater detail below is a process for fabricating waveguide mirrors in a waveguide on a semiconductor wafer without having to use additional lithographical patterning steps beyond those necessary to pattern the waveguide. The basic fabrication concept exploits the angular dependence of ion etch yield to produce angled facets in thin film steps. Referring to FIG. 1, the etch is used to form an angled interface between a low index of refraction material 195 (e.g. $SiO_2$) and high index of refraction material 197, e.g. SiGe. The transition from the high to low index of refraction at that angled interface produces a reflecting surface for light arriving at less than a certain critical angle that is determined by the differences in the indices of refraction.

The mirrors that are fabricated in the manner described herein have particular application and value in building optical ready substrates. Because of the importance of that particular application, we will first describe the underlying objectives of an optical ready substrate before describing the methods of fabricating the mirrors that can be used in them.

Optical Ready Substrates

In essence, the underlying principle behind optical ready substrates is that the optical signal distribution network is provided in such a way that its fabrication and the fabrication of the microelectronic circuitry are done totally or largely independently of each other.

The optical ready substrates provide a platform upon which electrical circuitry can subsequently be fabricated using conventional semiconductor fabrication techniques. By separating the fabrication of the optical signal distribution circuitry from the fabrication of the microelectronic circuitry in this way, the semiconductor microelectronics manufacturer can avoid having to develop a new technology or know-how for fabricating optical components on a semiconductor wafer. The semiconductor microelectronics manufacturer also avoids having to optimize its processes for fabricating the semiconductor electronics so as to also accommodate the fabrication of the optical components. Thus, for example, a company making CMOS circuitry that has optimized its fabrication processes for achieving ultra high precision and very high yields need not be concerned with having to modify its processes and possibly compromise its ultra high precision and high yields to also make optical elements along with the electrical components. In short, the semiconductor microelectronics manufacturer can simply rely on the expertise of an optical fabrication company to provide the optical elements and to optimize those processes and can, except for locating and making connections to the underlying optical signal distribution network, process the wafer just as though it was a blank semiconductor wafer. Of course, that is the ideal. In practice, the separation between the two technologies may not be as clean as that.

Figure 2:
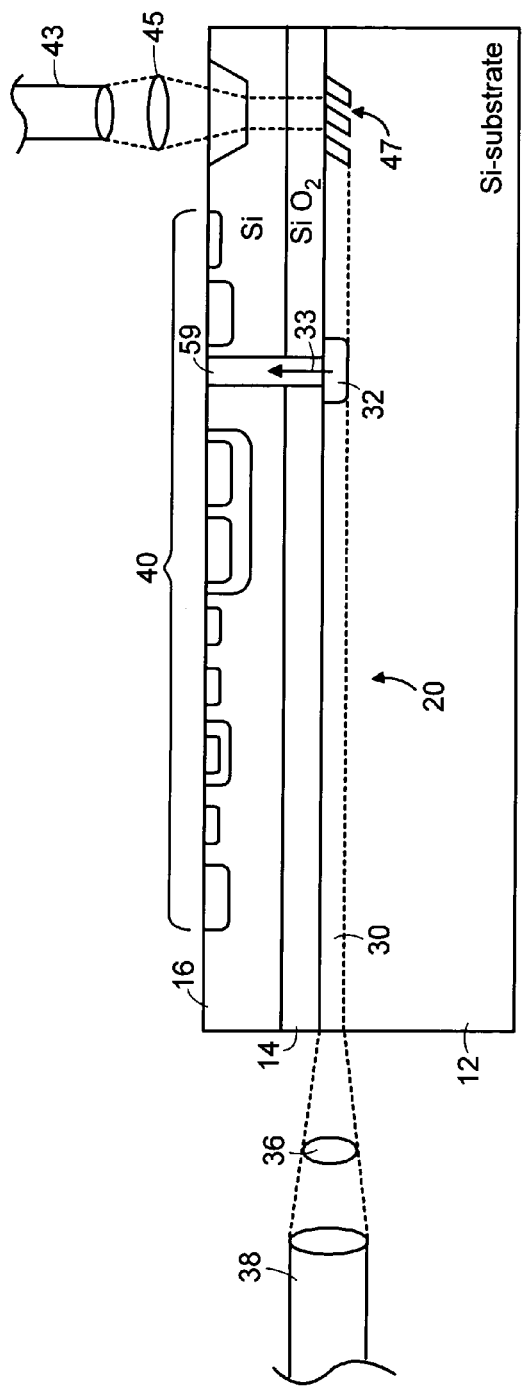
FIG. 2 shows an optical ready substrate.

An embodiment of an optical ready substrate 10 is shown in FIG. 2. Optical ready substrate 10 contains a semiconductor integrated optical signal distribution network 20 for distributing an optical clock signal to semiconductor integrated microelectronic circuitry 40 that was fabricated on top of the substrate above the optical circuitry at a later stage. Optical ready substrate 10 is an SOI (silicon-on-insulator) structure that includes a base substrate 12 of crystalline silicon, an insulating layer 14 of SiO2, and a thin upper layer 16 of crystalline silicon. Optical signal distribution network 20 is fabricated in substrate 12 just below insulating layer 14. Network 20 employs one or more of a number of fundamental building blocks, including optical waveguides 30 for distributing the optical signals between different locations on the chip; reflecting elements 47 for enabling optical signals to be introduced into the waveguides from above the chip or enabling optical signals to re-directed out of the waveguides; photodetectors 32 for converting the optical signals to electrical signals 33 that will be used by corresponding components of the microelectronic circuitry; and splitters (not shown) that divide the optical signals into multiple (in this case, two) components where branching occurs in the distribution network.

The optical input signal can be supplied in a number of different ways. According to one way, referred to generally as an edge coupling approach, a lens arrangement 36 focuses light from an external optical fiber 38 into optical waveguide 30. Alternatively, an optical fiber 43 delivers light through another arrangement of lenses 45 to waveguide 30 from a direction that is normal to the surface of the chip. In this case, a reflecting element 47 fabricated within waveguide 30 redirects that light into waveguide 30 along its longitudinal axis. Light can be extracted by using components similar or identical to reflecting element 47, lenses 45, and optical fiber 43.

The SOI structure that is depicted in FIG. 2 has advantages in microelectronic circuits due to the low dielectric capacitance and high resistance of the substrate. There are a number of known ways of fabricating SOI structures, some of which are described by B. Jalali et al. in "Advances in Silicon-on-Insulator Optoelectronics," B. Jalali et al., IEEE Journal of Selected Topics in Quantum Electronics, Vol. 4, No. 6, November/December 1998 (pp. 938–947). Two approaches that are useful for fabricating the embodiment of FIG. 1 are the bond-and-etchback SOI (BESOI) technique and the smart cut process.

According to the BESOI technique, a first silicon wafer is oxidized followed by a hydrophilic bonding of the oxide layer to the bare surface of a second silicon wafer. The first silicon wafer is then thinned and polished by mechanical and mechanical/chemical processes to the desired thickness. The optical signal circuits would be fabricated into the side of the second wafer that provides the bare surface to which the oxide layer will be bonded. The thinned first silicon wafer would then provide the substrate into which the microelectronics are later fabricated.

According to the smart cut process, an oxidized silicon wafer is implanted with hydrogen through the oxide surface layer. After that, the oxide surface is bonded to the surface of a bare silicon wafer by hydrophilic bonding. During a subsequent heat treatment the first silicon wafer splits into two parts leaving a thin silicon layer on top of the oxide layer (thereby removing much of the silicon substrate). The new exposed surface of the silicon is then polished by mechanical and chemical/mechanical methods. In this case, the optical signal circuit would be fabricated into the surface of the bare silicon wafer prior to bonding that surface to the oxide surface of the first wafer.

There are multiple ways of implementing the optical ready substrate concept other than as SOI structure. For example, an epitaxial layer can be grown on top of the silicon which contains the optical circuitry. Or the optical ready network layer can be bonded to a silicon wafer in which the microelectronic circuitry has been already fabricated and then the multiple layers of metalization interconnects can be fabricated on top of the optical layer. Or one can use a flip chip design according to which the optical network is fabricated into one chip and the microelectronic circuitry is fabricated into a second wafer and the one chip is flipped over onto the other one and bump bonds are provided for electrically interconnecting the two chips. In all of these approaches, the principle is basically the same. The optical network and the microelectronic circuits are fabricated separately and are typically located in different layers.

A Method for Fabricating Mirrors for the Optical Ready Substrates

Figure 3:
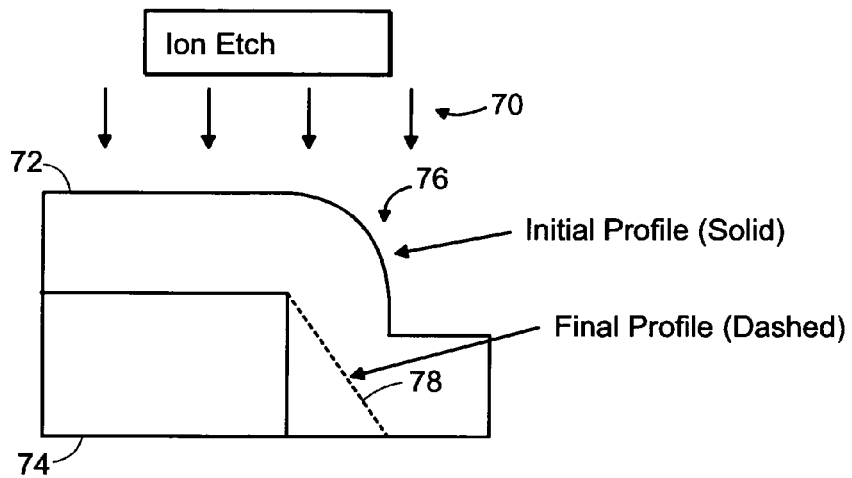
FIG. 3 illustrates the etch phenomenon that is employed in making the waveguide mirrors.

Referring to FIG. 3, when one performs a sputter etch of a film with an ion beam 70 that is directed perpendicular to the surface 72 of the wafer 74, the ion beam has the tendency to remove material from angled surfaces 76 more quickly than from surfaces that are oriented perpendicular to the beam. This is a widely recognized phenomenon about which a considerable amount of literature has been written. (See for example, *VLSI Technology*, edited by S. M Sze, McGraw-Hill, 1983, pp. 332–334; Machida, Katsuyuki et al., "$SiO_2$ Planarization Technology with Biasing and Electron Cyclotron Resonance Plasma Deposition for Submicron Interconnections," J. Vac. Sci. Technol. B 4 (4), pp. 818–821, July/August 1986; Machida, Katsuyuki et al., "Effect of Oxygen Ions on Filling $SiO_2$ into Holes Using Biased Electron Cyclotron Resonance Plasma Deposition," J. Vac. Sci. Technol. B 11(2), pp. 224–227, March/April 1993; and Labun, A. H., "Profile Simulation of Electron Cyclotron Resonance Planarization of an Interlevel Dielectric," J. Vac. Sci. Technol. B 12(6), pp. 3138–3144, November/December 1994).

The consequence of this phenomenon is that when an oxide is etched using a directional ion beam, it will produce faceting on corners of features onto which the oxide film has been deposited. In general, the faceting that occurs is quite well behaved and controllable.

By appropriately selecting the etch conditions, e.g. the pressure, the energy of the beam, and the species of the gas used, one can control the characteristics and angle of the faceting that occurs. Moreover, by using this phenomenon of directional ion etching, it is possible to produce facets on the inside corners of trenches over which an oxide film has been deposited.

This process may, depending on the process conditions that were chosen to fabricate the mirrors, produce some curvature in the remaining angled portion. The curvature reduces the quality of the mirror but by keeping the curvature minimized through process control, the resulting mirror should still perform adequately for the requirements of the optical ready substrates.

The method for making the angled mirrors inside of the waveguide structure is straightforward and requires at most one mask for defining the trench that will be formed to define the waveguide. The method is illustrated in FIGS. 4 and 5*a–e*, the details of which are as follows.

It should be understood that the process steps outlined in FIGS. 5*a–e* are meant to only schematically represent a process flow. An actual process flow will certainly contain additional process steps of the type that are well known and commonly used in the industry. Some of the additional steps that are not represented in this process flow because they represent details well known to persons skilled in the art include surface cleans, additional etch steps, additional film depositions, etc. An additional etch step, for example, might be needed if the oxide is not completely removed from the bottom surface of the waveguide. The illustrated process flow is meant to disclose the basic idea of how the angled mirrors are formed by producing a facet by using an angle dependent ion etch.

Figure 4:
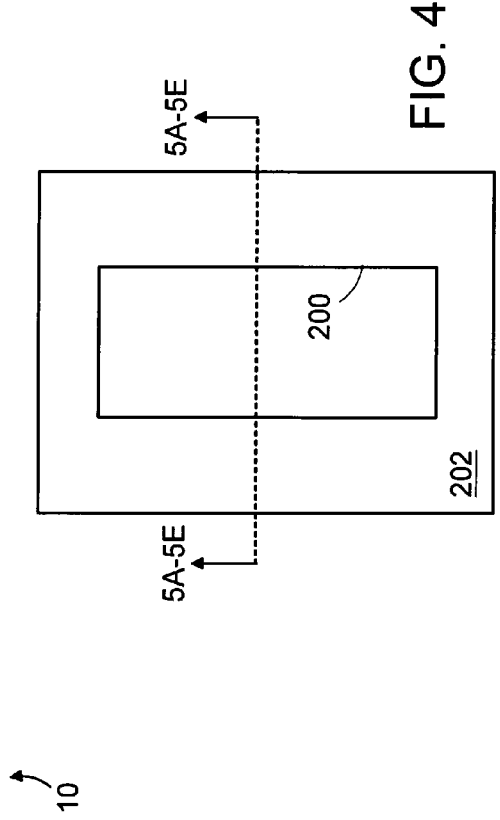
FIG. 4 is a top view of a trench in a silicon substrate for a waveguide.
Figure 5A:
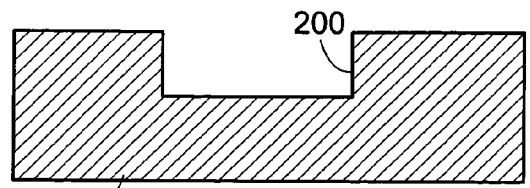
FIGS. 5a–e illustrate the process for fabricating the waveguide mirrors.

First, a trench 200 is etched into a silicon substrate 202 (FIGS. 4 and 5*a*). Trench 200 will define the outer perimeter of the SiGe waveguide core that will later be deposited into the trench. The length and shape of the trench, e.g. straight or serpentine or branched, depends of course of the particular application. Typically, the cross-sectional dimensions might be, for example, about 1μ deep by about 3μ wide, though those numbers are simply meant to be illustrative and not limiting.

Figure 5B:
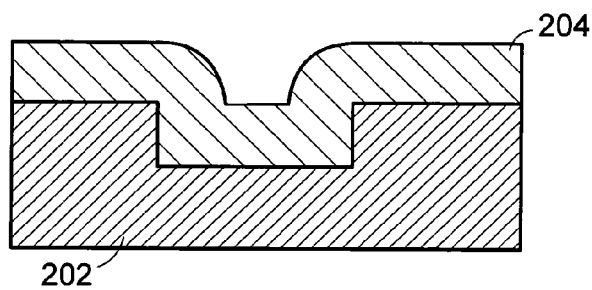

After trench 200 is formed, a silicon oxide film 204 is deposited onto wafer and into trench 200 (FIG. 5*b*). The silicon dioxide represents a low index of refraction material relative to the SiGe that will later be deposited.

Figure 5C:
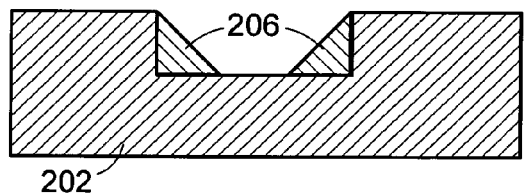
Figure 5D:
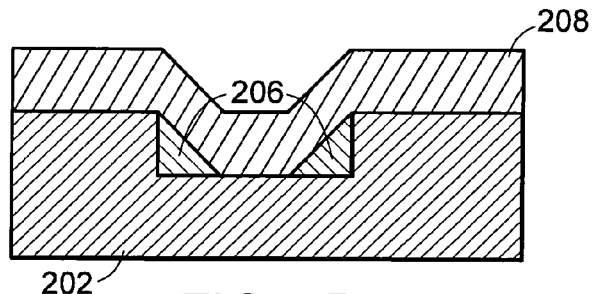

After the silicon oxide is deposited, the structure is ion etched with a directional ion beam that is oriented perpendicular to the substrate (FIGS. 3 and 5*c*). The ion etch is allowed to continue until the oxide is removed from the top of the substrate and from much of the bottom of the trench, leaving an angled oxide portion 206 filling each of the inside corners of trench 200. The process conditions, e.g. pressure, energy of the beam, and composition of the gas, are selected to achieve the desired angle and quality of the angled portion of oxide.

Next, SiGe is deposited onto the substrate to produce a SiGe film 208 that is at least as thick as trench 200 is deep (FIG. 5*d*), thus completely filling up the trench. The percentage of Ge is selectable depending on design considerations. Typically, one might use 7–10% Ge. The higher the percentage of Ge, the more the waveguide core will tend to contain the light within the core, which becomes particularly important at bends within the waveguide where light losses tend to be higher. Thus, the higher percentages of Ge enable one to fabricate bends with a smaller radii of curvature.

Figure 5E:
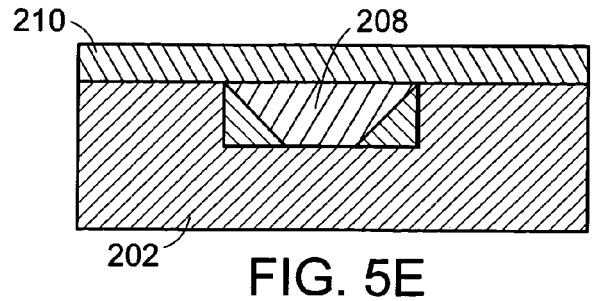

After the waveguide is filled with SiGe, the surface of the substrate is planarized by using, for example, chemical mechanical polishing (CMP) (FIG. 5*e*). This is carried out until all of the SiGe is removed from above the surface of the substrate, leaving the trench filled with SiGe.

Finally, an upper layer 210 of silicon is deposited over the surface of the substrate to form an upper cladding to the SiGe waveguide (FIG. 5*e*). This can be accomplished a number of different ways, one of which is by epitaxial growth.

Note that one also will get mirrors on the sides of the trench as well as its ends where the mirrors need to be located. The faceting along the sides of the trench will actually further aid in containing the optical light within the waveguide.

If the angle that is produced is precisely 45°, then the light source or the detector would be place directly above the mirror. However, the angle need not be 45°. A different angle, if it does not diverge too far from 45°, would still be usable. It simply means that the light source, the optical pick up, or the detector, whatever the case might be, must be placed at a location that is offset from a point that is directly above the mirror. As long as the angle is predictable and controllable, then this will work as well as a 45° angle.

The quality of the mirrors fabricated in the manner described above is less than can be achieved by other more time consuming, more complex techniques, but the quality is sufficient for the purpose of optical data signal or optical clock signal distribution in the optical ready wafers described above. Also, no extra mask steps are required to produce these mirrors.

The details of the above-mentioned fabrication techniques for carrying out the various steps of the process are well known in the art and thus are not provided here. This information is readily available in the literature and from the companies that make the equipment that carries out the corresponding processes.

The particular process flow illustrated in FIGS. 5*a–e* is just one of many process flows that could be used to create a waveguide mirror using the basic idea of angle-dependent ion etch. One potentially important alternative would be to use biased $SiO_2$ CVD, in which ECR (Electron Cyclotron Resonance) or HDP (High Density Plasma) reactors simultaneously deposit and etch the oxide. The high-energy ions in such a process would also produce an angle-dependent etch phenomenon similar to using the ion etch process alone. The process of simultaneous oxide deposition/etch was an oxide planarization process that received much attention before oxide CMP planarization became widespread in the IC industry. In intermediate stages of planarization using ECR or HDP, strikingly angular (uncurved) faceting of the oxide is commonly observed during the process.

Materials other than SiO$_2$ are also known to exhibit facet behavior. So, it is possible to create the facet in another material, two examples of which are photoresist and polyimide. If another material is used (e.g. polyimide), it could be deposited on top of the oxide, the facet could be formed in the polyimide, and then the facet geometry could be transferred to the oxide using an anisotropic etch process in which the etch rates of polyimide and oxide were roughly equal. It should be noted, however, that some variants of this approach may involve an additional lithographic mask step These two examples do not exhaust the possible variants of the process flow for creating a waveguide mirror using an angle-dependent etch.

Figure 6:
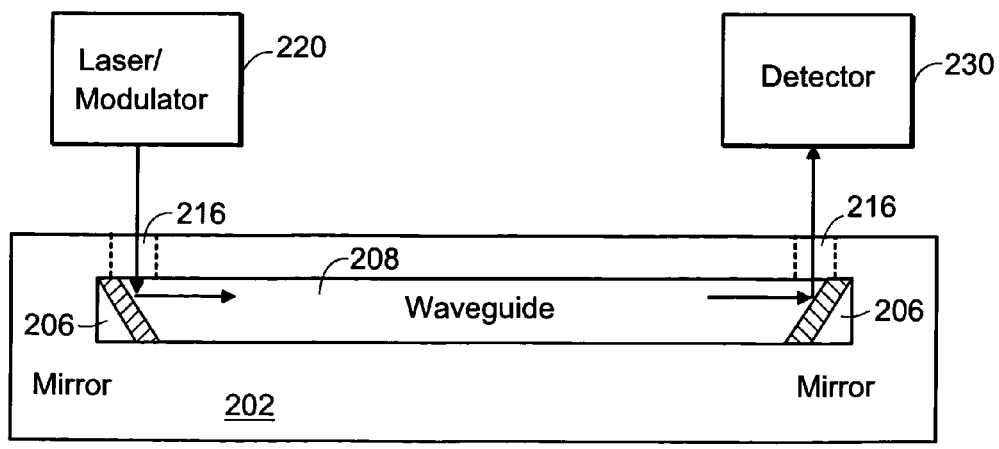
FIG. 6 is a schematic representation of an optical signal distribution network which employs the waveguide mirrors described herein.

An optical signal distribution network that includes the structure described above is schematically depicted in FIG. 6. It includes the waveguide with the angled mirrors at each end, one for receiving an optical signal into the waveguide and the other for re-directing the distributed optical signal. The optical signal is delivered to the waveguide by an off-chip laser or optical modulator 220 and the distributed optical signal is detected by an off-chip optical detector 230. To enable the optical signal to pass to and from the waveguide, vias 216 are provided through the material above the waveguide. Those vias may be filled with a material that is transparent at the wavelengths of the optical signal.

Other embodiments are within the following claims. For example, films other than an oxide can be used. Indeed, any other amorphous film with the right index contrast will do similar things. This includes, without limitation, SiN, silicon oxynitride, and silicon carbide/silicon oxycarbide.

What is claimed is:

1. A method of fabricating a waveguide mirror, said method comprising:

etching a trench in a substrate;

depositing a film over the surface of the substrate and into the trench;

etching the film to remove at least some of the deposited film and to leave an angled surface of film in an inside corner of the trench;

depositing a layer of semiconductor over the substrate to fill up the trench;

planarizing the deposited semiconductor to remove the semiconductor from above the level of the trench, wherein the angled surface of film produces a reflecting surface of the waveguide mirror that is arranged to direct light out of or into the trench.

2. The method of claim 1 wherein etching of the trench in the substrate involves etching the trench in a silicon substrate.

3. The method of claim 1 wherein depositing the film involves depositing a blanket layer of oxide.

4. The method of claim 3 wherein depositing the blanket layer of oxide involves depositing SiO$_2$.

5. The method of claim 1 wherein depositing the film involves depositing a blanket layer of amorphous material.

6. The method of claim 1 wherein depositing the film involves depositing a blanket layer of SiN.

7. The method of claim 1 wherein depositing the film involves depositing a blanket layer of silicon oxynitride.

8. The method of claim 1 wherein depositing the layer of semiconductor involves depositing SiGe.

9. The method of claim 3 wherein etching the blanket layer of oxide involves using an angle-dependent etch process.

10. The method of claim 3 wherein etching the blanket layer of oxide involves dry etching.

11. The method of claim 3 wherein etching the blanket layer of oxide involves ion etching.

* * * * *